United States Patent
Marupaduga et al.

(10) Patent No.: US 11,350,304 B1
(45) Date of Patent: May 31, 2022

(54) USE OF BACKHAUL LOAD AS BASIS TO CONTROL CONFIGURATION OF DUAL-CONNECTIVITY

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 199 days.

(21) Appl. No.: 16/358,425

(22) Filed: Mar. 19, 2019

(51) Int. Cl.
*H04W 28/02* (2009.01)
*H04W 24/08* (2009.01)
*H04W 76/16* (2018.01)
*H04W 92/04* (2009.01)
*H04W 88/10* (2009.01)

(52) U.S. Cl.
CPC ....... *H04W 28/0247* (2013.01); *H04W 24/08* (2013.01); *H04W 76/16* (2018.02); *H04W 88/10* (2013.01); *H04W 92/045* (2013.01)

(58) Field of Classification Search
CPC ............. H04W 56/00; H04W 56/0015; H04W 56/0035
See application file for complete search history.

(56) References Cited

U.S. PATENT DOCUMENTS

| | | | |
|---|---|---|---|
| 2014/0355762 A1* | 12/2014 | Zhang | H04L 9/083 380/270 |
| 2015/0341838 A1 | 11/2015 | Pinheiro et al. | |
| 2016/0135248 A1* | 5/2016 | Liao | H04L 5/001 370/331 |
| 2016/0212790 A1* | 7/2016 | Fujishiro | H04W 92/20 |
| 2018/0084513 A1* | 3/2018 | Sheashua | H04W 56/0035 |

OTHER PUBLICATIONS

H. Galeana-Zapien and R. Ferrus, "Design and Evaluation of a Backhaul-Aware Base Station Assignment Algorithm for OFDMA-Based Cellular Networks," IEEE Transactions on Wireless Communications, vol. 9, No. 10, pp. 3226-3237, Oct. 2010.

* cited by examiner

*Primary Examiner* — Ayaz R Sheikh
*Assistant Examiner* — Debebe A Asefa (57) ABSTRACT

A method and system to control configuration of dual-connectivity for UEs served by a first NB. A computing system monitors the level of load on a backhaul interface through which the first NB communicates with a core network. And based on the monitored level of backhaul load, the computing system imposes a limit on establishing secondary connectivity with one or more second NBs for one or more UEs served by the first NB. For instance, when the backhaul interface through which the first NB communicates with the core network becomes threshold highly loaded with communication traffic, the computing system could responsively impose a maximum cap on the number of the first-NB-served UEs that will be provided with secondary connectivity by one or more second NBs and/or on the number of secondary connections that will be established for UEs served by the first NB.

20 Claims, 8 Drawing Sheets

USE OF BACKHAUL LOAD AS BASIS TO CONTROL CONFIGURATION OF DUAL-CONNECTIVITY

A cellular wireless network typically includes a number of base stations or other access nodes, referred to without limitation as Node-Bs (NBs), that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each NB could be coupled with a core network that provides connectivity with various application servers and/or transport networks, such as the public switched telephone network (PSTN) and/or the Internet for instance. With this arrangement, a UE within coverage of the cellular network could engage in air interface communication with a NB and could thereby communicate via the NB with various application servers and other entities.

Such a network could operate in accordance with a particular radio access technology, with communications from the NBs to UEs defining a downlink or forward link and communications from the UEs to the NBs defining an uplink or reverse link.

In accordance with the radio access technology, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the base stations and UEs.

Over the years, the industry has embraced various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

As the industry advances from one generation of radio access technology to the next, issues arise with the need for UEs to support potentially multiple radio access technologies at once. With the transition from 4G to 5G, for instance, it is expected that UEs will be configured to support use of both technologies concurrently, with an arrangement referred to as EUTRA-NR Dual Connectivity (EN-DC). With such an arrangement, a UE might include a 4G radio and a 5G radio, with the 4G radio being served by a 4G base station concurrently with the 5G radio being served by a 5G base station.

More generally, dual connectivity could encompass service on two or more radio access technologies concurrently. This arrangement could help support transition from one radio access technology to another. Further, the arrangement could provide a UE with increased peak data rate, by allowing the UE to engage in data communications multiplexed over two or more such connections.

OVERVIEW

In a representative dual-connectivity implementation, a NB operating according to one of the radio access technologies functions as a master NB (MeNB) for the dual-connectivity service and as an anchor point for associated control signaling with the core network, and a NB operating according to the other radio access technology operates as a secondary NB (SeNB) to provide secondary connectivity for UEs served by the MeNB. With EN-DC, for instance, a 4G NB would operate as the MeNB, and a 5G NB would operate as the SeNB. These NBs could be collocated at a common cell site and could thus share various cell-site equipment such as a baseband unit, a network router, and antenna tower for instance.

In practice, a UE could initially scan for and establish a connection with an MeNB, and the MeNB could engage in signaling with the core network to facilitate setup of a bearer for carrying data communications to and from the UE and could then serve the UE over a master air-interface connection between the MeNB and the UE. Further, once the UE is connected with the MeNB, the MeNB could then interwork with an SeNB to establish a secondary air-interface connection between the SeNB and the UE so that the SeNB could then concurrently serve the UE over that secondary connection.

With the UE's master and secondary connections so established, a portion of the UE's data communication with the core-network gateway could flow over the UE's master connection with the MeNB while another portion of the UE's data communication with the gateway could flow via the UE's secondary connection with the SeNB. To facilitate this, the UE's established bearer could be split accordingly.

In an example implementation, the UE's bearer could be split in the core network, such as at a core-network gateway. To facilitate this the MeNB could engage in signaling with a core-network controller to arrange for the bearer split. With this configuration, a portion of the UE's data communication would flow between the core network and the MeNB and over the master connection between the MeNB and the UE, while another portion of the UE's data communication would flow between the core network and the SeNB and over the secondary connection between the SeNB and the UE.

And in another example implementation, the UE's bearer could instead be split at the MeNB. With this configuration, all of the UE's data communication would flow between the core network and the MeNB, and the MeNB and SeNB would exchange a portion of that data communication. Thus, a portion of the UE's data communication would flow between the core network and the MeNB and over the master connection between the MeNB and the UE, while another portion of the UE's data communication would flow between the core network and the MeNB, between the MeNB and the SeNB, and over the secondary connection between the SeNB and the UE.

In each of these or other such implementations, serving the UEs with dual-connectivity could help provide the UEs with increased peak data rate as noted above. Unfortunately, however, use of dual-connectivity to increase UEs' data rate could also have the adverse effect of increasing load on the backhaul interface through which the MeNB communicates with the core network. And that increased backhaul load could present issues for the MeNB, including possibly restricting key control signaling between the MeNB and the core network.

In the first example implementation above, for instance, the MeNB's communication with the core network may flow through a backhaul router that interfaces the cell site with the core network, and the SeNB's communication with the core network may flow through that same backhaul router. With this configuration, adding secondary connections for UEs could thus result in an increased data flow through the backhaul interface used by the MeNB, which could strain the limited capacity of that backhaul interface and pose issues for the MeNB's backhaul communication.

And in the second example implementation above, both data communications served by the MeNB and data communications served by the SeNB would flow through the MeNB and through the MeNB's backhaul interface with the core network. Thus, with this configuration, adding secondary connections for UEs could likewise result in an increased data flow through the backhaul interface used by the MeNB, which could similarly strain the limited capacity of that backhaul interface and pose issues for the MeNB's backhaul communication.

Disclosed herein is a mechanism to help address this problem.

In accordance with the disclosure, a computing system will monitor the level of load on the backhaul interface through which a first NB (e.g., MeNB) communicates with a core network. And based on that level of backhaul load, the computing system will impose a limit on establishing secondary connectivity with one or more second NBs (e.g., SeNBs) for one or more UEs served by the first NB.

For instance, when the backhaul interface through which the first NB communicates with the core network becomes threshold highly loaded with communication traffic, the computing system could responsively impose a maximum cap on the number of the first-NB-served UEs that will be provided with secondary connectivity by one or more second NBs and/or on the number of secondary connections that will be established for UEs served by the first NB.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system having a cell site that includes both 4G LTE and 5G NR NBs and that supports EN-DC service. It should be understood, however, that the principles disclosed herein could extend to apply with respect to other scenarios as well, such as with respect to other radio access technologies and dual-connectivity configurations. Further, it should be understood that numerous variations from the specific arrangements and processes described are possible. For instance, various described entities, connections, functions, and other elements could be added, omitted, distributed, re-located, re-ordered, combined, or changed in other ways.

Figure 1:
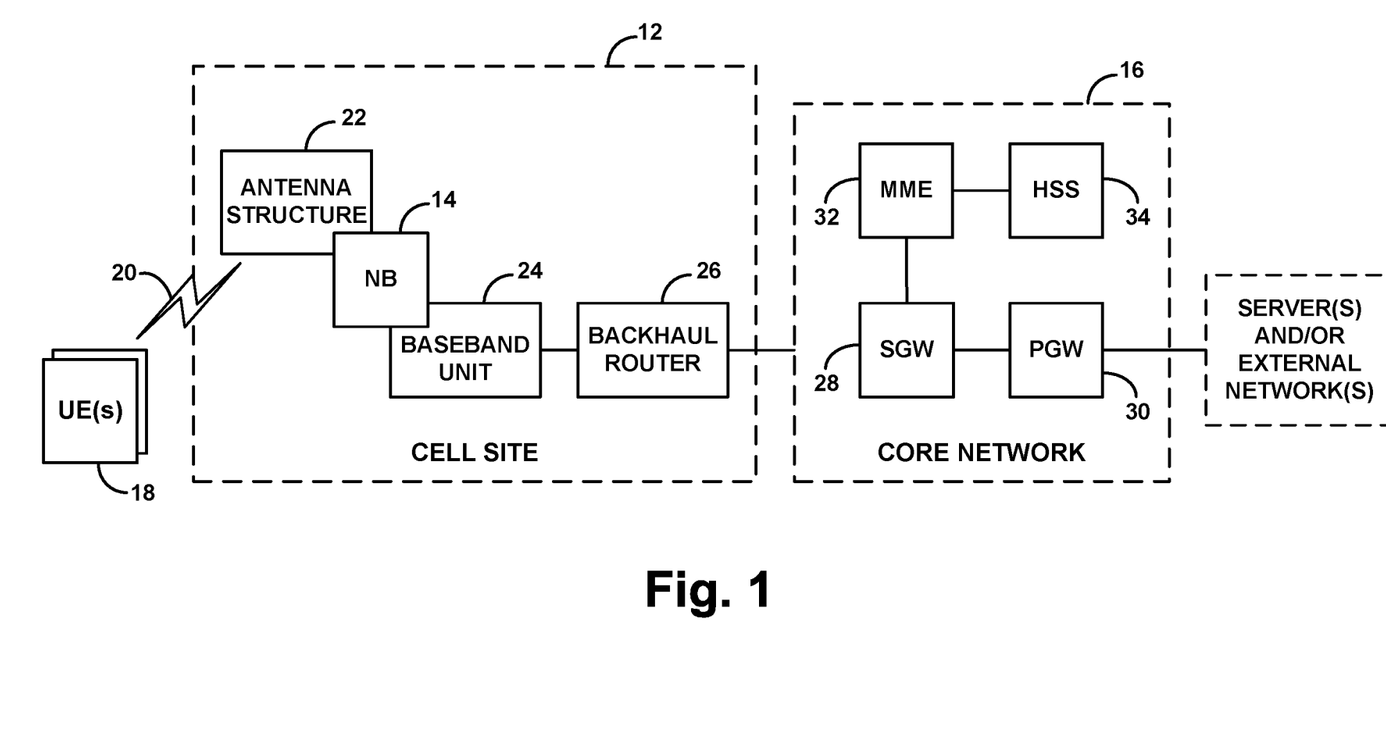
FIG. 1 is a simplified block diagram of an example network arrangement in which aspects of the present disclosure can be implemented.

FIG. 1 is a simplified block diagram of an example system, including a representative cell site 12 with a representative NB 14, and including a representative core network 16 and one or more representative UEs 18.

In this example system, the NB 14 provides a wireless coverage area 20 that operates according to a representative air interface protocol such as 4G LTE or 5G NR. As such, the NB 14 could be configured to provide service on one or more carriers, such as one or more TDD carriers and/or FDD carriers, each spanning respective frequency bandwidth. Further, the NB 14 could be configured to aggregate the bandwidth of multiple carriers in order to serve UEs 18 with high-speed data communication on multiple carriers at once.

The representative NB 14 could take the form of a macro NB of the type typically configured with an antenna tower or the like to provide a broad range of coverage, or a small cell, femtocell, or the like, typically having a smaller form factor and providing a more narrow range of coverage, among other possibilities. The NB 14 could include an antenna structure 22 for engaging in air-interface communication with UEs 18, and a baseband unit 24 for generating downlink signals for transmission by the antenna structure and decoding received uplink transmissions. Further, the cell site 12 could include a backhaul router 26 for interfacing between the NB 14 and the core network 16.

The representative core network 16 could comprise a private packet-switched network configured to support UE service via one or more NBs such as NB 12, to facilitate UE access to services and/or other networks. As shown, the representative core network 16 includes a serving gateway (SGW) 28, a packet-data-network gateway (PGW) 30, a mobility management entity (MME) 32, and a home subscriber server (HSS) 34. These network entities may sit as nodes on the core network 16, each having a respective Internet Protocol (IP) address on the core network 16, to facilitate packet-based communication between the entities, via defined tunnels or other interfaces. The NB 14 could also be provided with an IP address on the core network to facilitate communication with the core network, i.e., with various core-network entities such as the MME 32, the SGW 28, and perhaps with other NBs, for instance.

In this arrangement, the MME 32 operates as an example control node for the core network 16 and may be part of a group or pool of MMES operable control the core network 16.

And the HSS 34 may operate to store UE profile data and the like. The SGW 28 and PGW 30 then operate as a gateway system of the core network 16, with the SGW 28 interfacing with the NB 14 and with the PGW 30, and with the PGW 30 operable to provide connectivity with one or more application servers and/or external transport networks 36 (e.g., with one or more application servers being accessible within the core network 16 or via one or more external networks with which the core network 16 provides connectivity) and to assign IP addresses to UEs to facilitate their communication on and via the core network 16.

When a UE 18 enters into coverage of NB 14, the UE 18 could engage in random-access signaling and connection-signaling with the NB 14, to establish a connection, such as a logical Radio Resource Control (RRC) connection, with the NB 14, and the NB 14 could configure the connection to encompass possibly multiple carriers to facilitate high-speed data communication as noted above. Further, the UE 18 could initiate an attachment process (if not a handover process) to register with the network, by transmitting to the NB 14 an attach request, which the NB 14 could forward to MME 32 to facilitate authentication and attachment processing.

In response to the UE's attach request, the MME 32 could then work to authenticate the UE 18 and to set up for the UE 18 a bearer that defines a logical packet tunnel between the UE 18 and the PGW 30 to facilitate communication between the UE 18 and one or more application servers and/or via external networks 36. For instance, the MME 32 could engage in signaling with the NB 14 and the SGW 28 to set up for the UE an S1 tunnel between the NB 14 and the SGW 28, and the SGW 28 could responsively engage in signaling with the PGW 30 to set up for the UE an S5 (or S8) tunnel between the SGW 28 and PGW 30, with the S1 and S5 tunnels cooperatively defining an access bearer for carrying packet data communications to and from the UE 18 via the NB 14. And the NB 14 could engage in signaling with the UE 18 to establish a corresponding radio bearer between the UE 18 and the NB 14.

Once the UE 18 is so connected and attached, the NB 14 could serve the UE with packet-data communications. When the PGW 30 receives packet data destined to the UE 18 (e.g., from an application server and/or external network), that data could flow via the UE's bearer to the NB 14. And the NB 14 could then select downlink air interface resources, such as physical resource blocks spanning particular time and frequency segments on one or more carriers, to carry the data to the UE 18, and could engage in scheduling communication with the UE 18 to specify the resources and transmit the data to the UE 18 on the scheduled resources. Likewise, when the UE 18 has data to transmit (e.g., to an application server and/or external network), the UE 18 could send a scheduling request to the NB 14, the NB 14 could select uplink air interface resources to carry the data from the UE 18 and could engage in scheduling communication with the UE 18 to specify the resources, the UE 18 could transmit the data to the NB 14 on the scheduled resources, and the data could then flow via the UE's bearer to the PGW 24 for output to its destination.

Figure 2:
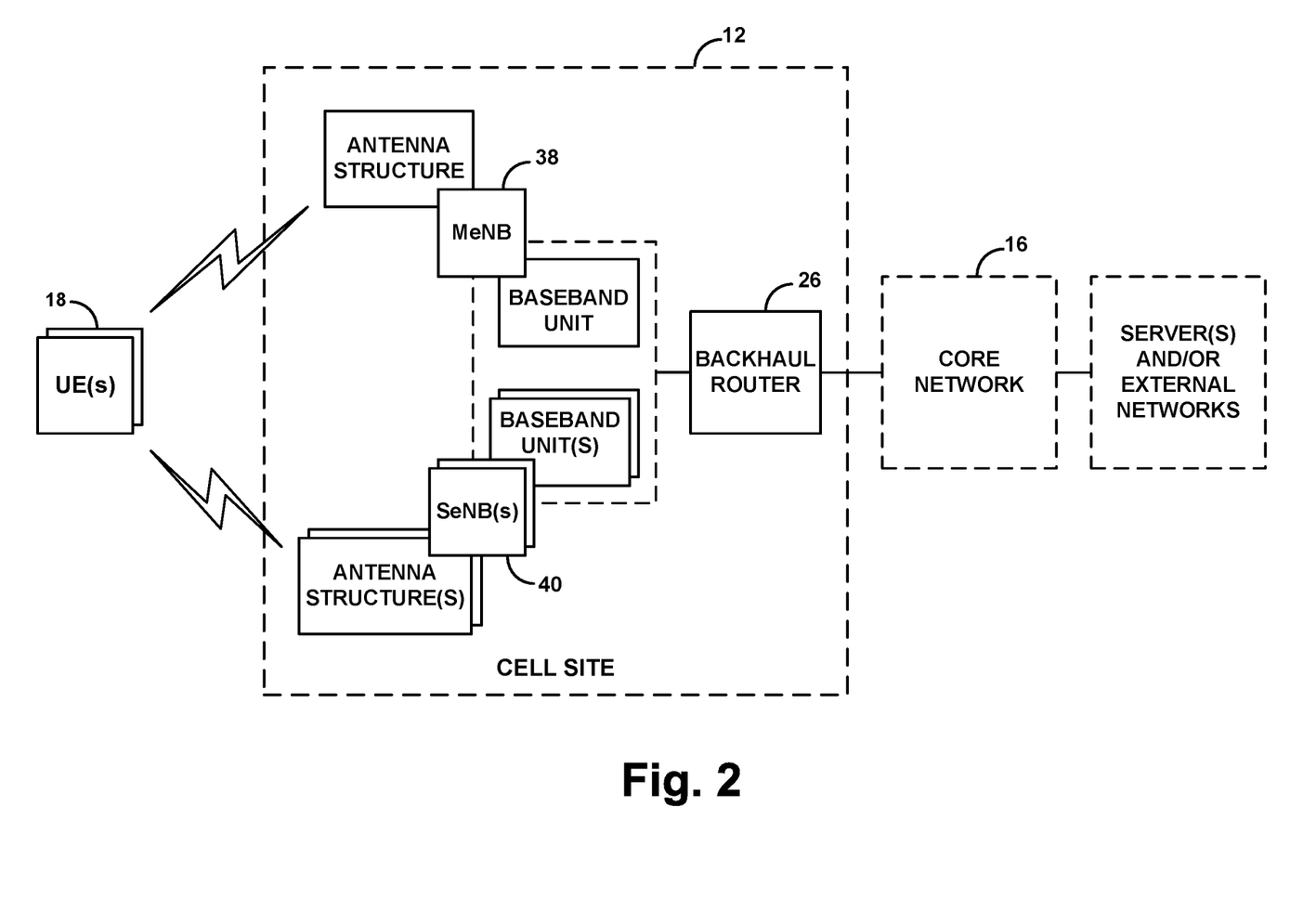
FIG. 2 is another simplified block diagram of an example network arrangement in which aspects of the present disclosure can be implemented.

FIG. 2 is next a simplified block diagram of an example arrangement in which cell site 12 includes multiple NBs. In particular, the multiple NBs includes a first NB 38 that could function as an MeNB for dual-connectivity purposes and one or more second NBs 40 that could function as secondary NBs (SeNBs) for dual-connectivity purposes. As shown in the example arrangement, each NB includes a respective antenna structure, and each NB includes a respective baseband unit. Alternatively, the NBs could share a common antenna structure and/or a common baseband unit.

Each of these NBs could be configured as discussed above to serve UEs over a respective air interface connection when appropriate. For instance, each NB could engage in connection-signaling with a UE to establish an RRC connection between the NB and the UE, with the RRC connection possibly encompassing multiple carriers (a cell group, as noted above) to support high-speed data service for the UE and could then serve the UE in an RRC connected mode.

In a representative implementation, the MeNB 38 could be a 4G LTE NB (eNB), and each SeNBs 40 could be a 5G NB (gNB). In this case, the 4G air interface and 4G service provided respectively by the MeNB 38 could differ from the 5G air interface and 5G service provided by each 5G NB 40 in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In FIG. 2, as in FIG. 1, cell site 12 includes backhaul router 26 for interfacing with the core network 16. This backhaul interface could carry communications passing between the MeNB 38 and various core network entities, including UE data communications served by the MeNB and signaling communications between the MeNB 38 and the MME 32. Further, this backhaul interface could also carry UE data communications served by the SeNB(s) 40.

With the illustrated arrangement, each UE 18 could be configured to discover and connect by default with the MeNB 38, and when appropriate the MeNB 38 could work to set up dual-connectivity for the UE 18, adding one or more secondary connections with one or more of the SeNBs 40, so that the UE 18 could receive dual-connectivity service.

For instance, the UE 18 could initially engage in random-access signaling and connection-signaling with the MeNB 38 to establish a master RRC connection between the UE 18 and the MeNB 38. And the UE 18 could transmit an attach request to the MeNB 38, which the MeNB 38 could forward to the MME 32 to facilitate authentication and attachment of the UE, including setup of a bearer for the UE 18. Further, the MeNB 38 could coordinate addition of one or more secondary 5G connections between the UE 18 and one or more SeNBs 40, so that the UE could then concurrently engage in packet-data communication through the UE's master connection with the MeNB 38 and each of the UE's one or more secondary connections with one or more SeNBs 40.

To facilitate setup of dual-connectivity service for a UE 18 served by the MeNB 38, the MeNB 38 could provide the UE 18 with a list of 5G carriers on which the UE 18 should scan for coverage, the UE 18 could scan for coverage on each such 5G carrier and report to MeNB 38 the 5G coverage detected by the UE 18, and MeNB 38 could then direct the UE 18 to connect with the SeNB(s) 40 that provide the reported coverage. The UE 18 could then engage in random-access signaling and connection-signaling with each such SeNB 40 to establish a secondary RRC connection between the UE 18 and the SeNB 40. And the MeNB 38 could further engage in signaling with each such SeNB 40 to associate each such added RRC connection with the UE 18 served by the MeNB 38.

In addition, to enable the concurrent service of the UE 18 by the MeNB 38 and each of one or more SeNBs 40, the MeNB could coordinate or engage in signaling to facilitate splitting the UE's bearer so as to allow a portion of the UE's bearer communication to be served by the MeNB 38 and one or more other portions of the UE's bearer communication to be served respectively by one or more added SeNBs 40.

This bearer split could be done in various ways, including at the SGW 28 or at the MeNB 38, among other possibilities.

To facilitate a bearer split at the SGW 28, the MeNB 38 could engage in signaling with the MME 32 to inform the MME 32 of each of the one or more SeNBs that will provide secondary connectivity for the UE 18, and the MME 32 could responsively engage in signaling with each such SeNB 40 and with the SGW 28, to split the UE's bearer at the SGW 28 into separate S1 interfaces, one extending between the SGW 28 the MeNB 38, and one extending respectively between the SGW 28 and each of the one or more SeNBs 40.

Figure 3:
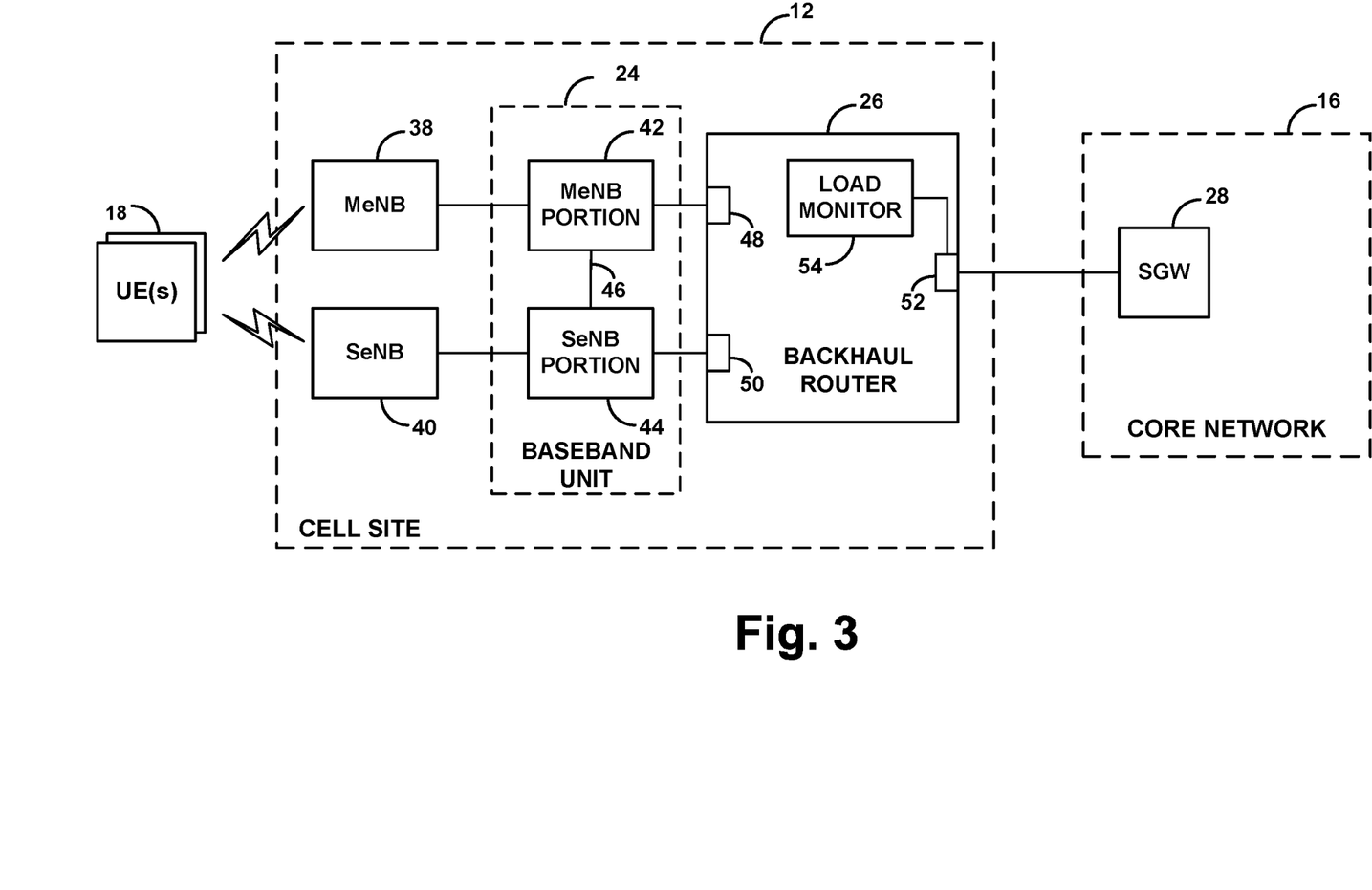
FIG. 3 is a depiction of an example split bearer arrangement in which data communication flows through a backhaul interface of an MeNB.

FIG. 3 helps illustrate how this example split-bearer arrangement could thus play out in terms of data flow between the cell site and the core network. Namely, FIG. 3 illustrates the MeNB 38 and a representative SeNB 40 sharing a common baseband unit 24 conceptually illustrated as having an MeNB portion 42 and an SeNB portion 44 coupled by an inter-NB interface (e.g., X2 interface) 46. And FIG. 3 illustrates the baseband unit 24 being interconnected with the backhaul router 26 that interfaces between the cell site 12 and the core network 16. In particular, the figure shows one network port 48 of the backhaul router 26 being connected with the MeNB portion 42 of the baseband unit 24, another network port 50 of the backhaul router 26 being connected with the SeNB portion 44 of the baseband unit 24, and yet another port 52 of the backhaul router 26 being connected with the core network 16.

With this example arrangement, as noted above, the portion of the UE's data communication that is served by the MeNB 38 would flow via the backhaul router 26 and particularly through port 52 to and from the SGW 28 of the core network 16. And the portion of the UE's data communication that is served by the SeNB 40 would also flow via the backhaul router 26 and particularly through port 52 to and from the SGW 28.

On the other hand, to facilitate a bearer split at the MeNB 38, the MeNB 38 could engage in signaling through inter-NB interface 46 to coordinate splitting of the UE's bearer at the MeNB 38, so that the portion of the UE's data communication that is served by SeNB would flow over that inter-NB interface and through the MeNB 38 and the MeNB's S1 interface with SGW 28, rather than flowing over an S1 interface between the SeNB and the SGW 28.

Figure 4:
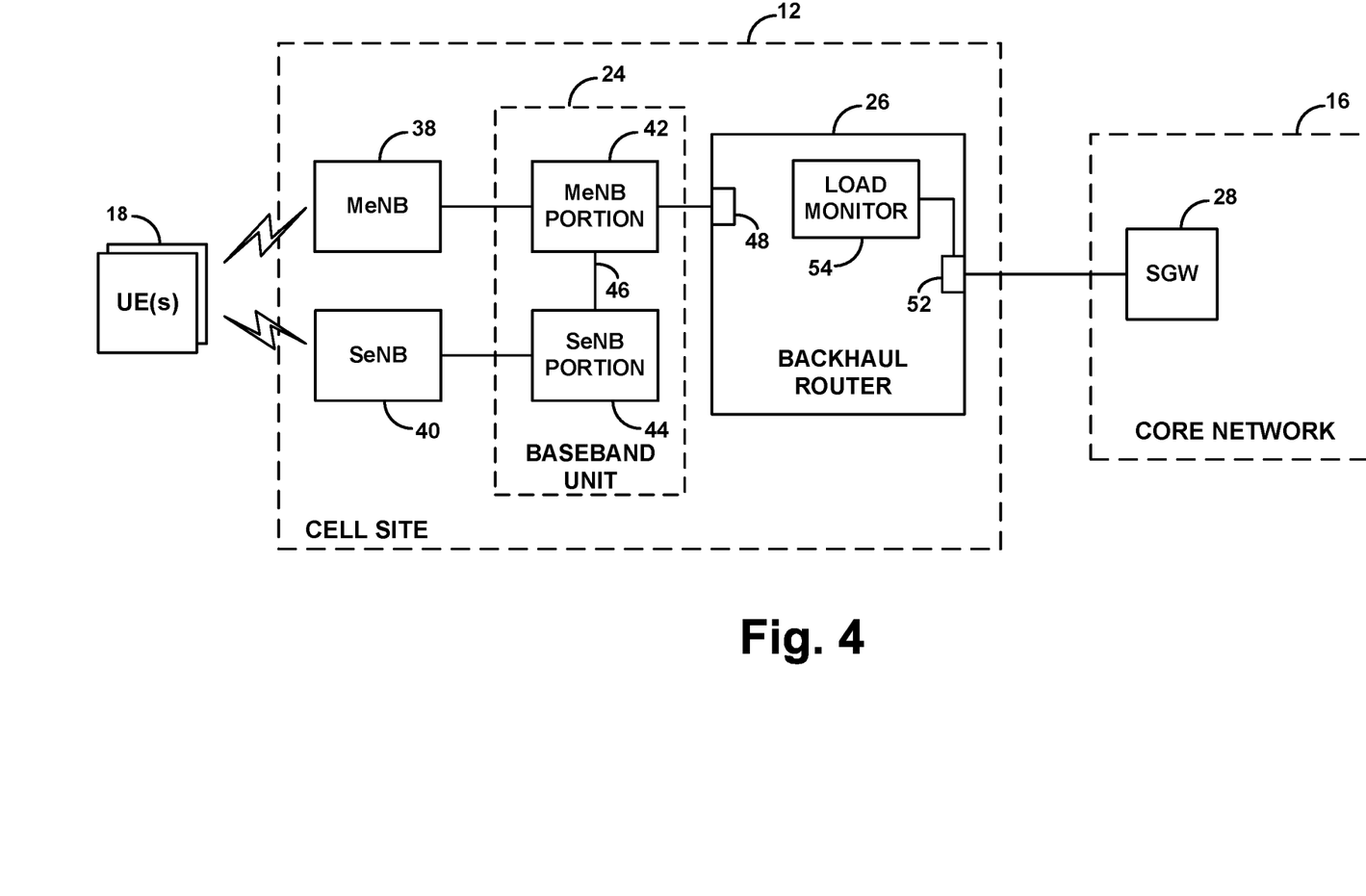
FIG. 4 is a depiction of another example split bearer arrangement in which data communication flows through a backhaul interface of an MeNB.

FIG. 4 helps illustrate how this alternative example split-bearer arrangement could play out in terms of data flow between the cell site and the core network. Namely, FIG. 4 again illustrates the MeNB 38 and a representative SeNB 40 sharing the common baseband unit 24 with the MeNB portion 42 and the SeNB portion 44. And FIG. 4 illustrates the baseband unit 24 being interconnected with the backhaul router 26 that interfaces between the cell site 12 and the core network 16. Further, FIG. 4 shows the network port 48 of the backhaul router 26 being connected with the MeNB portion 42 of the baseband unit 24 and the network port 52 of the backhaul router 26 being connected with the core network 16. But unlike FIG. 3, FIG. 4 does not show a network port of the backhaul router 26 being connected with the SeNB portion 44 of the baseband unit 24.

With this example arrangement, as noted above, the portion of the UE's data communication that is served by the MeNB 38 would flow via the backhaul router 26 and particularly through port 52 to and from SGW 28. And the portion of the UE's data communication that is served by the SeNB 40 would flow over inter-NB interface 46 between the SeNB 40 and the MeNB 38 and also via the backhaul router 26 and particularly through port 52 to and from the SGW 28.

With this or other such dual-connectivity configured, the MeNB 38 and each of one or more SeNBs 40 could then concurrently serve the UE 18. For downlink communication, packet-data communication destined to the UE 18 could flow from the core network to the NBs serving the UE 18, and each NB could transmit a respective portion of the data to the UE 18, with the transmissions optimally occurring concurrently so as to facilitate cumulatively high speed transmission. And for uplink communication, the UE 18 could transmit a separate respective portion of its packet-data communication to each NB serving the UE 18, likewise with the transmissions optimally occurring concurrently so as to facilitate cumulatively high speed transmission, and the packet data could flow from each NB to the core network for forwarding to its destination.

As noted above, such dual-connectivity service of one or more UEs could contribute to load on the backhaul interface through which the MeNB 38 communicates with the core network 38. For example, in the arrangements shown in FIGS. 3 and 4, communication of packet data on each secondary connection added between an SeNB 40 and a UE served by the MeNB 38 could result in increased data flow through at least port 52 of the backhaul router 26. Depending on the capacity of the backhaul interface, if many such secondary connections are established for UEs served by the MeNB 38, the backhaul interface could become congested enough that the MeNB's key communications with core network entities may be delayed or otherwise compromised.

As indicated above, the present disclosure provides for addressing this issue by monitoring the level of load on the backhaul interface through which the MeNB 38 communicates with the core network 16 (e.g., with one or more core-network entities) and using that level of load as a basis to limit the extent to which secondary connections are added for one or more UEs served by the MeNB 38.

This process could be implemented by a computing system at the cell site 12 and/or elsewhere. For instance, the computing system could be provided as part of the MeNB 38, the backhaul router 26, and/or by one or more entities.

In an example implementation, the computing system could include a backhaul-load monitor 54 configured to monitor the level of load on the backhaul interface through which the MeNB 38 communicates with the core network and perhaps to determine when that level of load reaches one or more predefined threshold levels.

As shown in FIGS. 3 and 4, this load monitor 54 could be provided within the backhaul router 26 (e.g., as a programmatic function of the router) to monitor the level of load at or in connection with port 52 through which MeNB 38 communicates with the core network. Alternatively or additionally, this load monitor could be provided elsewhere within the backhaul communication path between the MeNB 38 and one or more core network entities, such as at a core-network edge-router through which the MeNB 38 communicates with the core network, among other possibilities.

The load monitor could regularly monitor the level of load on the MeNB's backhaul interface in various ways. For instance, the load monitor could monitor the level of load in terms of an average or other statistical measure of rate of communication traffic flow through the backhaul interface, a percentage of the backhaul interface's maximum capacity used, and/or an extent of buffering and delay of communications through the backhaul interface, possibly over a sliding window of time. And the load monitor could output reports or other indications of the determined level of load to one or more other entities.

Further, the computing system could be configured to determine when the monitored level of load on the MeNB's backhaul interface rises to one or more predefined threshold levels where it may be useful to impose dual-connectivity restrictions, and to responsively trigger imposition of such restrictions.

For instance, the load monitor could be configured to detect when the MeNB's backhaul load rises to one or more such thresholds and to signal to the MeNB 38 (e.g., to the MeNB portion 42 of the baseband unit 24) to cause the MeNB 38 to impose associated dual-connectivity restrictions. Or the MeNB 38 could be configured to detect when the backhaul load as measured by the load monitor rises to one or more such thresholds, and to responsively impose associated dual-connectivity restrictions. (The system could apply hysteresis in this process, to help avoid imposing restrictions in response to momentary spikes in backhaul load.)

To facilitate this, the computing system could be provisioned with one or more such predefined thresholds and with indications of associated dual-connectivity restrictions that the MeNB 38 should impose. For instance, the system could be provisioned to map one level of load to imposition of a given dual-connectivity restriction that the MeNB 38 should impose. Or the system could be provisioned with a table or other mapping data that specifies various levels of load (e.g., 75% loaded, 85% loaded, 95% loaded, etc.) and that maps each such level of load to a different associated dual-connectivity restriction to that the MeNB 38 should impose.

The MeNB 38 may or may not by default limit the extent of dual-connectivity service. But when the backhaul load rises to one or more such threshold levels, the MeNB 38 may impose associated new or harsher dual-connectivity restrictions. Further, once the backhaul load falls to below the threshold level(s), the system could then clear or reduce the newly added or harsher dual-connectivity restrictions.

As noted above, a dual-connectivity restriction that the MeNB 38 imposes in response to determining that the MeNB's backhaul load has become threshold high could take various forms. By way of example, the MeNB 38 could impose a maximum cap on the number of its served UEs that will each be provided with one or more secondary connections for dual-connectivity service at any given time. For instance, the cap could be no more than N UEs concurrently served with dual-connectivity. In that case, once N of the MeNB's served UEs are each being served with dual-connectivity service and thus each have one or more secondary connections with one or more SeNBs 40, the MeNB 38 could forgo configuring additional dual-connectivity service for any of the MeNB's served UEs unless and until the total drops to below N, or until the dual-connectivity restriction is removed.

And as another example, the MeNB 38 could impose a maximum cap on the number of secondary connections that the MeNB 38 would permit to exist at any given time cumulatively for all of the UEs that the MeNB 38 serves. For instance, the cap could be no more than N secondary connections existing at any given time. In that case, once the MeNB's served UEs cumulatively have N established secondary connections, the MeNB 38 could forgo configuring additional secondary connections for any of the MeNB's served UEs unless and until that total drops to below N, or until the dual-connectivity restriction is removed. Other examples could be possible as well.

Figure 5:
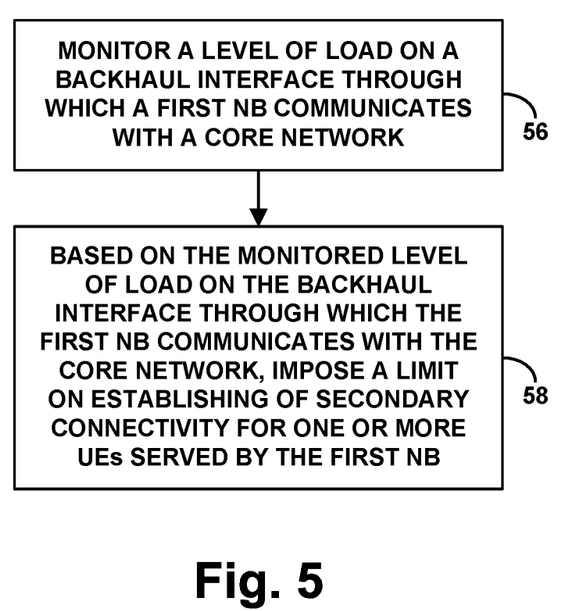
FIG. 5 is a flow chart depicting an example method in accordance with the disclosure.

FIG. 5 is a flow chart depicting an example method for controlling configuration of secondary connectivity for one or more UEs served by a first NB (e.g., a 4G NB). As shown in FIG. 5, at block 56, the method includes monitoring a level of load on a backhaul interface through which the first NB communicates with a core network. Further, at block 58 (which could be carried out in parallel with block 56), the method includes, based on the monitored level of load on the backhaul interface through which the first NB communicates with the core network, imposing a limit on establishing of secondary connectivity for one or more UEs served by the first NB.

As discussed above, each UE of the one or more UEs could be served by the first NB over a respective master wireless connection between the UE and the first NB. And the act of establishing secondary connectivity for such a UE could involve establishing for the UE a secondary wireless connection between the UE and a second NB (e.g., a 5GNR NB), to enable the UE to be served concurrently over (i) the master wireless connection between the UE and the first NB and (ii) the secondary wireless connection between the UE and the second NB.

Further, as discussed above, the act of imposing the limit based on the monitored level of load could involve imposing the limit in response to the monitored level of load rising to a predefined threshold level. And imposing the limit on establishing of secondary connectivity for one or more UEs served by the first NB could involve imposing a maximum cap on quantity of first-NB-served UEs (i.e., UEs served by the first NB) for which secondary connectivity is established and/or imposing a maximum cap on quantity of secondary wireless connections established for one or more first-NB-served UEs, among other possibilities. Moreover, the first NB could be configured to coordinate the establishing of secondary connectivity, and the act imposing the limit on establishing of secondary connectivity could carried out by the first NB. Still further, as discussed above, the first NB and second NB could be collocated at a common cell site, and data communications served by the first NB and by the second NB could flow through the same backhaul interface as each other. And the act of monitoring the level of load on the backhaul interface through which the first NB communicates with the core network could be carried out at a backhaul router that interfaces between the cell site and the core network and/or elsewhere within a backhaul communication path between the first NB and one or more core-network entities.

Figure 6:
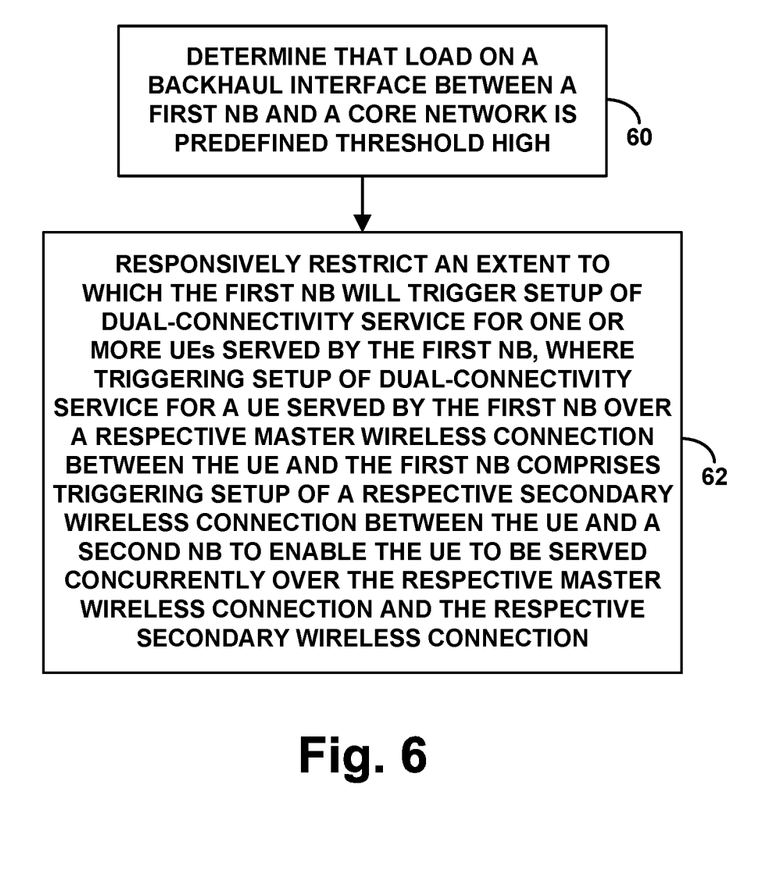
FIG. 6 is another flow chart depicting an example method in accordance with the disclosure.

FIG. 6 is next a flow chart depicting an example method for restricting setup of dual-connectivity when a first NB serves one or more UEs each over a master wireless connection with the first NB. As shown in FIG. 6, at block 60, the method includes determining that load on a backhaul interface between the first NB and a core network (e.g., an interface through which the first NB communicates on the core network) is predefined threshold high. And at block 62, the method includes, responsive to the determining that the load on the backhaul interface between the first NB and a core network is predefined threshold high, restricting an extent to which the first NB will trigger setup of dual-connectivity service for the one or more UEs served by the first NB, where triggering setup of dual-connectivity service for a UE served by the first NB over a respective master wireless connection between the UE and the first NB comprises triggering setup of a respective secondary wireless connection between the UE and a second NB to enable the UE to be served concurrently over the respective master wireless connection and the respective secondary wireless connection.

Features discussed above can be implemented in this context, and vice versa. For instance, here too, the act of restricting the extent to which the first NB will trigger setup of dual-connectivity service the one or more UEs served by the first NB could involve imposing a cap on quantity of the one or more UEs to be served with the dual-connectivity and/or imposing a cap on cumulative total quantity of secondary connections existing for the dual-connectivity service of the UEs.

Figure 7:
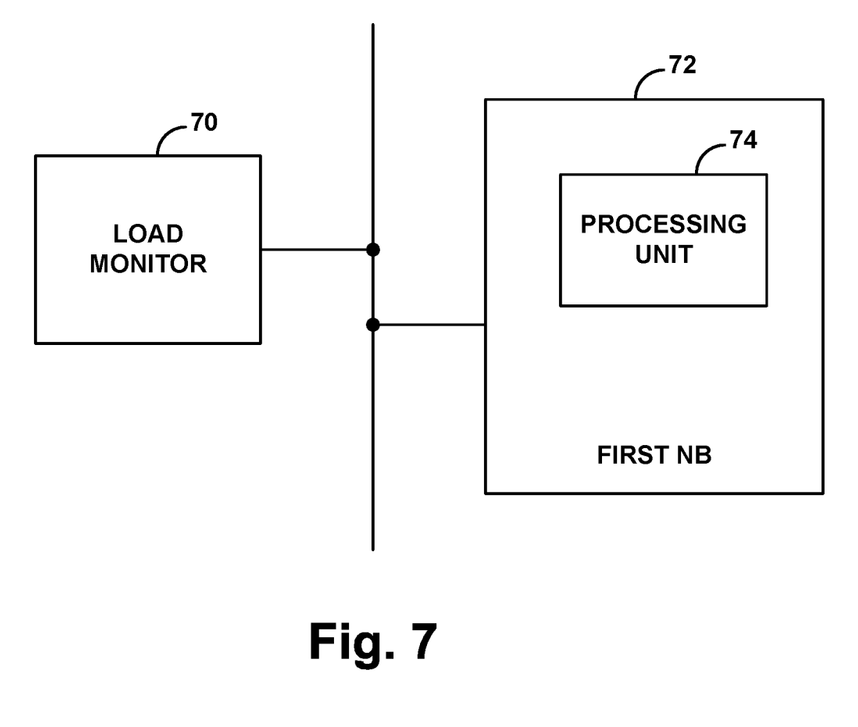
FIG. 7 is a simplified block diagram of a computing system operable in accordance with the present disclosure.

FIG. 7 is a simplified block diagram of a computing system operative to control configuration of secondary connectivity for one or more UEs served by a first NB. In line with the discussion above, aspects of this computing system could be provided by various entities discussed above, such as by the first NB and a backhaul router, among other possibilities.

As shown in FIG. 7, the computing system includes a load monitor 70, which could comprise a processing unit programmed to evaluate flow of communication traffic through a backhaul interface through which the first NB communicates with a core network so as to monitor a level of load on that backhaul interface. Further, the computing system includes the first NB 72 including a processing unit 74, which could be programmed to respond to the monitored level of load on the backhaul interface through which the first NB communicates with the core network by imposing a limit on establishing of secondary connectivity for one or more UEs served by the first NB.

Here too, features discussed above could be applied in this context, and vice versa.

For example, as discussed above, each UE could be served by the first NB over a respective master wireless connection between the UE and the first NB, 20, the processing unit of the first NB could be programmed to coordinate the establishing of secondary connectivity, and the act of establishing secondary connectivity for the UE could involve establishing for the UE a respective secondary wireless connection between the UE and a second NB, to enable the UE to be served concurrently over (i) the respective master wireless connection between the UE and the first NB and (ii) the respective secondary wireless connection between the UE and the second NB.

Further, responding to the monitored level of load by imposing the limit on establishing of secondary connectivity could then involve imposing the limit in response to the monitored level of load rising to a predefined threshold level and could involve imposing a maximum cap on quantity of first-NB-served UEs for which secondary connectivity is established and/or imposing a maximum cap on quantity of secondary wireless connections established for one or more first-NB-served UEs, among other possibilities.

Still further, the first NB and the second NB could be collocated at a common cell site, and data communications served by the first NB and by the second NB could flow through the same backhaul interface as each other, in which case the load monitor could be disposed at a backhaul router that interfaces between the cell site and the core network and/or elsewhere within a backhaul communication path between the first NB and one or more core-network entities.

Figure 8:
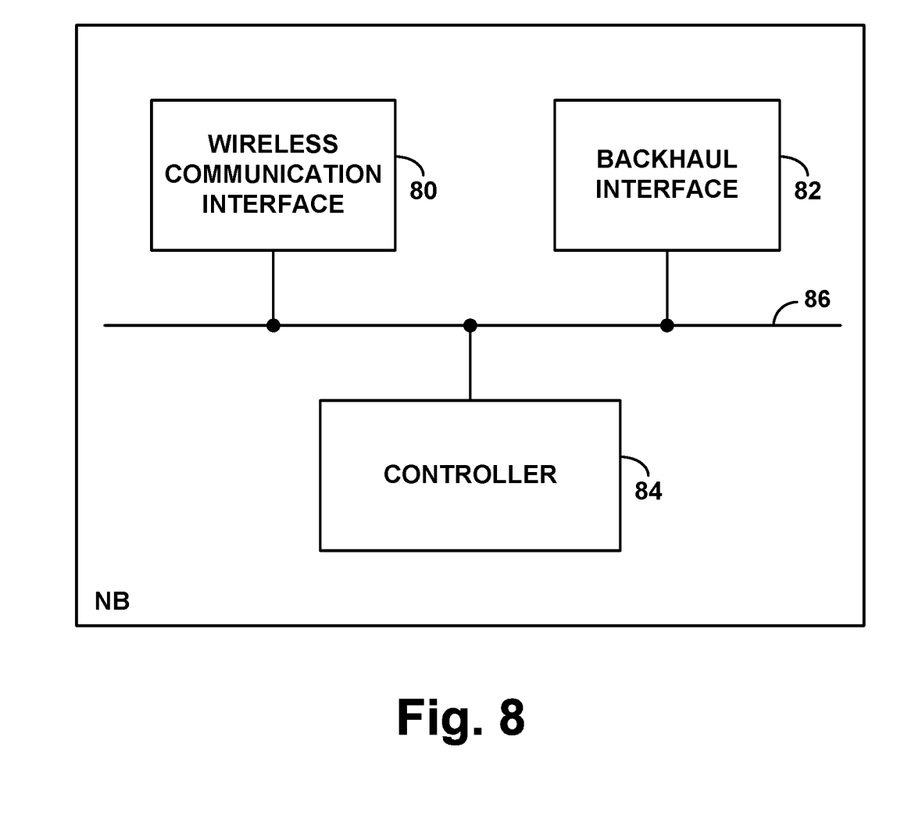
FIG. 8 is a simplified block diagram of a NB operable in accordance with the disclosure.

Finally, FIG. 8 is a simplified block diagram of an example NB that could be operable in accordance with the present disclosure. As shown, the example NB includes a wireless communication interface 80, a network communication interface 82, and a controller 84, all of which could be communicatively linked together by a system bus, network, or other connection mechanism 86.

In this arrangement, the wireless communication interface 80 could be configured to provide cellular coverage and to engage in air interface communication with served UEs. As such, wireless communication interface 80 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of bearer and control data over the air interface in accordance with a radio access technology such as any of those noted above. Further, network communication interface 82 could comprise a wired or wireless interface, such as an Ethernet network communication interface, configured to support communication with other entities, such as with MMEs, SGWs, and other NBs for instance.

Controller 84 could then comprise control logic to cause the NB to carry out particular operations including those discussed herein. As such, the controller 84 could take various forms, including but not limited to a processing unit including one or more processors (e.g., general purpose microprocessors and/or dedicated processing units) and data storage (e.g., one or more volatile and/or non-volatile storage components, such as magnetic, optical, or flash storage) holding program instructions executable by the processing unit to cause the base station to carry out various operations described herein. It should also be understood that the present disclosure also contemplates a non-transitory computer readable medium having encoded thereon program instructions executable to carry out these and/or other described operations.

Exemplary embodiments have been described above. Those skilled in the art will understand, however, that changes and modifications may be made to these embodiments without departing from the true scope and spirit of the invention.

We claim:

1. A method for controlling configuration of secondary wireless connectivity for one or more user equipment devices (UEs) served by a first Node-B (NB), the method comprising:
   monitoring a level of load on a backhaul interface through which the first NB communicates with a core network; and
   based on the monitored level of load on the backhaul interface through which the first NB communicates with the core network, imposing a limit on establishing of secondary wireless connectivity for one or more UEs served by the first NB,
   wherein each UE is served by the first NB over a respective master wireless connection between the UE and the first NB, and wherein establishing secondary wireless connectivity for the UE comprises establishing for the UE a secondary wireless connection between the UE and a second NB, to enable the UE to be served concurrently over (i) the master wireless connection between the UE and the first NB and (ii) the secondary wireless connection between the UE and the second NB.

2. The method of claim 1, wherein imposing the limit based on the monitored level of load comprises imposing the limit in response to the monitored level of load rising to a predefined threshold level.

3. The method of claim 1, wherein imposing the limit on establishing of secondary wireless connectivity for one or more UEs served by the first NB comprises:
  imposing a maximum cap on quantity of first-NB-served UEs for which secondary wireless connectivity is established.

4. The method of claim 1, wherein imposing the limit on establishing of secondary wireless connectivity for one or more UEs served by the first NB comprises:
  imposing a maximum cap on quantity of secondary wireless connections established for one or more first-NB-served UEs.

5. The method of claim 1, wherein the first NB is a 4G LTE NB, and wherein THE second NB is a 5GNR NB.

6. The method of claim 1, wherein the first NB and the second NB are collocated at a common cell site, and wherein data communications served by the first NB and by the second NB flow through the same backhaul interface as each other.

7. The method of claim 6, wherein monitoring the level of load on the backhaul interface through which the first NB communicates with the core network is carried out at a backhaul router that interfaces between the cell site and the core network.

8. The method of claim 6, monitoring the level of load on the backhaul interface through which the first NB communicates with the core network is carried out within a backhaul communication path between the first NB and one or more core-network entities.

9. The method of claim 1, wherein the first NB coordinates the establishing of secondary wireless connectivity, and wherein imposing the limit on establishing of secondary wireless connectivity is carried out by the first NB.

10. A method for restricting setup of dual-connectivity when a first Node-B (NB) serves one or more user equipment devices (UEs) each over a respective master wireless connection with the first NB, the method comprising:
  determining that load on a backhaul interface between the first NB and a core network is predefined threshold high; and
  responsive to the determining that the load on the backhaul interface between the first NB and a core network is predefined threshold high, restricting an extent to which the first NB will trigger setup of dual-connectivity service for the one or more UEs served by the first NB,
  wherein triggering setup of dual-connectivity service for a UE served by the first NB over a respective master wireless connection between the UE and the first NB comprises triggering setup of a respective secondary wireless connection between the UE and a second NB to enable the UE to be served concurrently over the respective master wireless connection and the respective secondary wireless connection, and
  wherein restricting the extent to which the first NB will trigger setup of dual-connectivity service for the one or more UEs served by the first NB comprises restricting an extent to which respective secondary wireless connections will be set up for the one or more UEs served by the first NB.

11. The method of claim 10, wherein restricting the extent to which the first NB will trigger setup of dual-connectivity service the one or more UEs served by the first NB comprises an operation selected from the group consisting of (i) imposing a cap on quantity of the one or more UEs to be served with the dual-connectivity and (ii) imposing a cap on cumulative total quantity of secondary connections existing for the dual-connectivity service of the UEs.

12. A computing system for controlling configuration of secondary wireless connectivity for one or more user equipment devices (UEs) served by a first Node-B (NB), the computing system comprising:
  a load monitor configured to monitor a level of load on a backhaul interface through which the first NB communicates with a core network; and
  a processing unit of the first NB, wherein the processing unit is programmed to respond to the monitored level of load on the backhaul interface through which the first NB communicates with the core network by imposing a limit on establishing of secondary wireless connectivity for one or more UEs served by the first NB,
  wherein each UE is served by the first NB over a respective master wireless connection between the UE and the first NB, and wherein establishing respective secondary wireless connectivity for the UE comprises establishing for the UE a secondary wireless connection between the UE and a second NB, to enable the UE to be served concurrently over (i) the respective master wireless connection between the UE and the first NB and (ii) the respective secondary wireless connection between the UE and the second NB.

13. The system of claim 12, wherein responding to the monitored level of load by imposing the limit on establishing of secondary wireless connectivity comprises imposing the limit in response to the monitored level of load rising to a predefined threshold level.

14. The system of claim 12, wherein imposing the limit on establishing of secondary wireless connectivity for one or more UEs served by the first NB comprises:
  imposing a maximum cap on quantity of first-NB-served UEs for which secondary wireless connectivity is established.

15. The system of claim 12, wherein imposing the limit on establishing of secondary wireless connectivity for one or more UEs served by the first NB comprises:
  imposing a maximum cap on quantity of secondary wireless connections established for one or more first-NB-served UEs.

16. The system of claim 12, wherein the first NB is a 4G LTE NB, and wherein the second NB is a 5GNR NB.

17. The system of claim 12, wherein the first NB and the second NB are collocated at a common cell site, and wherein data communications served by the first NB and by the second NB flow through the same backhaul interface as each other.

18. The system of claim 17, wherein load monitor is disposed at a backhaul router that interfaces between the cell site and the core network.

19. The system of claim 17, wherein the load monitor is disposed within a backhaul communication path between the first NB and one or more core-network entities.

20. The system of claim 12, wherein the processing unit of the first NB is further programmed to coordinate the establishing of secondary wireless connectivity.

* * * * *